(12) United States Patent
Ma et al.

(10) Patent No.: US 12,552,987 B2
(45) Date of Patent: Feb. 17, 2026

(54) ORGANIC METAL HALIDE HYBRID SCINTILLATORS AND METHODS OF MAKING

(71) Applicant: The Florida State University Research Foundation, Inc., Tallahassee, FL (US)

(72) Inventors: Biwu Ma, Tallahassee, FL (US); Tarannuma Ferdous Manny, Tallahassee, FL (US)

(73) Assignee: The Florida State University Research Foundation, Inc., Tallahassee (PL)

(*) Notice: Subject to any disclaimer, the term of this patent is extended or adjusted under 35 U.S.C. 154(b) by 0 days.

(21) Appl. No.: 19/286,705

(22) Filed: Jul. 31, 2025

(65) Prior Publication Data

US 2026/0035613 A1 Feb. 5, 2026

Related U.S. Application Data

(60) Provisional application No. 63/689,064, filed on Aug. 30, 2024, provisional application No. 63/677,463, filed on Jul. 31, 2024.

(51) Int. Cl.
| | |
|---|---|
| *C09K 11/06* | (2006.01) |
| *C07F 13/00* | (2006.01) |
| *G01T 1/202* | (2006.01) |

(52) U.S. Cl.
CPC ............ *C09K 11/06* (2013.01); *C07F 13/005* (2013.01); *G01T 1/2023* (2013.01); *C09K 2211/1007* (2013.01); *C09K 2211/1014* (2013.01); *C09K 2211/1022* (2013.01); *C09K 2211/1029* (2013.01); *C09K 2211/188* (2013.01)

(58) Field of Classification Search
None
See application file for complete search history.

(56) References Cited

U.S. PATENT DOCUMENTS

| | | | | |
|---|---|---|---|---|
| 5,882,548 | A | * 3/1999 | Liang | .................... C07C 211/65 |
| | | | | 252/301.16 |
| 12,164,066 | B2 | * 12/2024 | Ma | ........................ G01T 1/2018 |

(Continued)

FOREIGN PATENT DOCUMENTS

| | | | | |
|---|---|---|---|---|
| CN | 110331435 A | * 10/2019 | | ............... C30B 7/06 |
| CN | 110735182 A | * 1/2020 | | ............. C30B 29/12 |

(Continued)

OTHER PUBLICATIONS

Xu, Liang-Jin, et al. "Highly efficient eco-friendly X-ray scintillators based on an organic manganese halide." Nature communications 11.1 (2020): 4329.

(Continued)

*Primary Examiner* — Edwin C Gunberg
(74) *Attorney, Agent, or Firm* — Meunier Carlin & Curfman LLC (57) ABSTRACT

X-ray scintillators based on amorphous organic metal halide hybrid films are demonstrated, which can be prepared via a facile solution processing with a non-crystalline organic halide salt reacting with metal halide at low temperature. The solution processed scintillators exhibit excellent scintillation properties, thermal stability, mechanical resilience, and processability.

20 Claims, 10 Drawing Sheets

(56) References Cited

U.S. PATENT DOCUMENTS

| | | |
|---|---|---|
| 2024/0034929 A1 | 2/2024 | Ma et al. |
| 2024/0188435 A1 | 6/2024 | Liu et al. |

FOREIGN PATENT DOCUMENTS

| | | | |
|---|---|---|---|
| CN | 114180845 A | 3/2022 | |
| EP | 1258736 A1 * | 11/2002 | ........... G01T 1/2006 |

OTHER PUBLICATIONS

Shonde, Tunde Blessed, et al. "Molecular sensitization enabled high performance organic metal halide hybrid scintillator." Advanced Materials 35.23 (2023): 2301612.

Heo, Jin Hyuck, et al. "High-performance next-generation perovskite nanocrystal scintillator for nondestructive X-ray imaging." Advanced Materials 30.40 (2018): 1801743.

Jana, Atanu, et al. "Perovskite: Scintillators, direct detectors, and X-ray imagers." Materials Today 55 (2022): 110-136.

Wu, Haodi, et al. "Metal halide perovskites for X-ray detection and imaging." Matter 4.1 (2021): 144-163.

Zhou, Yang, et al. "Metal halide perovskites for X-ray imaging scintillators and detectors." ACS energy letters 6.2 (2021): 739-768.

Lecoq, Paul. "Development of new scintillators for medical applications." Nuclear Instruments and Methods in Physics Research Section A: Accelerators, Spectrometers, Detectors and Associated Equipment 809 (2016): 130-139.

Ou, Xiangyu, et al. "Recent development in x-ray imaging technology: Future and challenges." Research (2021).

Shonde, Tunde Blessed, et al. "Dramatically enhanced X-ray scintillation of BODIPY via sensitization by an organic metal halide." ACS Materials Letters 4.2 (2022): 271-276.

Maddalena, Francesco, et al. "Inorganic, organic, and perovskite halides with nanotechnology for high-light yield X-and y-ray scintillators." Crystals 9.2 (2019): 88.

Gupta, Santosh K., and Yuanbing Mao. "Recent advances, challenges, and opportunities of inorganic nanoscintillators." Frontiers of Optoelectronics 13.2 (2020): 156-187.

Zhao, Shuangyi, et al. "Solvent-free synthesis of inorganic rubidium copper halides for efficient wireless light communication and X-ray imaging." Advanced Functional Materials 33.47 (2023): 2305858.

Yanagida, Takayuki. "Inorganic scintillating materials and scintillation detectors." Proceedings of the Japan Academy, Series B 94.2 (2018): 75-97.

Ma, Wenbo, et al. "Thermally activated delayed fluorescence (TADF) organic molecules for efficient X-ray scintillation and imaging." Nature materials 21.2 (2022): 210-216.

Chen, Qiushui, et al. "All-inorganic perovskite nanocrystal scintillators." Nature 561.7721 (2018): 88-93.

Dujardin, Christophe, et al. "Needs, trends, and advances in inorganic scintillators." IEEE Transactions on Nuclear Science 65.8 (2018): 1977-1997.

Wang, Jian-Xin, et al. "Heavy-atom engineering of thermally activated delayed fluorophores for high-performance X-ray imaging scintillators." Nature Photonics 16.12 (2022): 869-875.

Zhou, Chenkun, et al. "Luminescent zero-dimensional organic metal halide hybrids with near-unity quantum efficiency." Chemical science 9.3 (2018): 586-593.

Zhou, Lei, Jin-Feng Liao, and Dai-Bin Kuang. "An overview for zero-dimensional broadband emissive metal-halide single crystals." Advanced Optical Materials 9.17 (2021): 2100544.

Zhou, Chenkun, et al. "Organic-inorganic metal halide hybrids beyond perovskites." Materials Research Letters 6.10 (2018): 552-569.

Li, Mingze, and Zhiguo Xia. "Recent progress of zero-dimensional luminescent metal halides." Chemical Society Reviews 50.4 (2021): 2626-2662.

Song, Enhai, et al. "Mn2+-activated dual-wavelength emitting materials toward wearable optical fibre temperature sensor." Nature Communications 13.1 (2022): 2166.

Xu, Liang-Jin, et al. "Green-light-emitting diodes based on tetrabromide manganese (II) complex through solution process." Advanced Materials 29.10 (2017): 1605739.

Liu, He, et al. "Efficient red light emitting diodes based on a zero-dimensional organic antimony halide hybrid." Advanced Materials 35.9 (2023): 2209417.

He, Qingquan, et al. "Highly stable organic antimony halide crystals for X-ray scintillation." ACS Materials Letters 2.6 (2020): 633-638.

Li, Bohan, et al. "Zero-dimensional luminescent metal halide hybrids enabling bulk transparent medium as large-area X-ray scintillators." Advanced Optical Materials 10.10 (2022): 2102793.

Zhang, Zhi-Zhong, et al. "Large-area laminar TEA2MnI4 Single-crystal scintillator for X-ray imaging with impressive high resolution." ACS Applied Materials & Interfaces 14.42 (2022): 47913-47921.

Xu, Tingting, et al. "Lead-free zero-dimensional organic-copper (I) halides as stable and sensitive X-ray scintillators." ACS Applied Materials & Interfaces 14.12 (2022): 14157-14164.

Su, Binbin, et al. "Zero-dimensional organic copper (I) iodide hybrid with high anti-water stability for blue-light-excitable solid-state lighting." Advanced Optical Materials 10.12 (2022): 2102619.

Jin, Jiance, et al. "Zn2+ doping in organic manganese (II) bromide hybrid scintillators toward enhanced light yield for X-ray imaging." Advanced Optical Materials 11.14 (2023): 2300330.

Shao, Wenyi, et al. "Highly efficient, flexible, and eco-friendly manganese (II) halide nanocrystal membrane with low light scattering for high-resolution X-ray imaging." ACS Applied Materials & Interfaces 15.1 (2023): 932-941.

Shonde, Tunde Blessed, et al. "Aggregation-induced emission organic metal halide complex for X-ray scintillation." Materials Horizons 11.13 (2024): 3076-3081.

Sun, Chen, et al. "Achieving near-unity photoluminescence quantum yields in organic-inorganic hybrid antimony (III) chlorides with the [SbCI5] geometry." Angewandte Chemie 135.10 (2023): e202216720.

Liu, Yucheng, et al. "Inch-size OD-structured lead-free perovskite single crystals for highly sensitive stable X-ray imaging." Matter 3.1 (2020): 180-196.

Liang, Dehai, et al. "Mn2+-based luminescent metal halides: syntheses, properties, and applications." Advanced Optical Materials 11.15 (2023): 2202997.

Morad, Viktoriia, et al. "Manganese (II) in tetrahedral halide environment: factors governing bright green luminescence." Chemistry of Materials 31.24 (2019): 10161-10169.

Jiang, Tingming, et al. "Highly efficient and tunable emission of lead-free manganese halides toward white light-emitting diode and X-ray scintillation applications." Advanced Functional Materials 31.14 (2021): 2009973.

Wei, Haotong, et al. "Sensitive X-ray detectors made of methylammonium lead tribromide perovskite single crystals." Nature Photonics 10.5 (2016): 333-339.

Xu, Liang-Jin, et al. "Ligand-mediated release of halides for color tuning of perovskite nanocrystals with enhanced stability." The Journal of Physical Chemistry Letters 10.19 (2019): 5836-5840.

Xiao, Shang-Biao, et al. "Ultrahigh X-ray imaging spatial resolution enabled by an OD Mn (II) hybrid scintillator." Advanced Functional Materials 34.40 (2024): 2404003.

Liu, He, et al. "Organic semiconducting ligands passivated CsPbBr3 nanoplatelets for blue light-emitting diodes." ACS Energy Letters 8.10 (2023): 4259-4266.

Wang, Xiao, et al. "Organic phosphors with bright triplet excitons for efficient X-ray-excited luminescence." Nature Photonics 15.3 (2021): 187-192.

Li, Bohan, et al. "In situ recrystallization of zero-dimensional hybrid metal halide glass-ceramics toward improved scintillation performance." Chemical Science 14.43 (2023): 12238-12245.

Luo, Jian-Bin, et al. "A melt-quenched luminescent glass of an organic-inorganic manganese halide as a large-area scintillator for radiation detection." Angewandte Chemie 135.7 (2023): e202216504.

(56) References Cited

OTHER PUBLICATIONS

Zhang, Zhi-Zhong, et al. "Organic-Inorganic Hybrid Mn-Based Transparent Glass for Curved X-Ray Scintillation Imaging." Advanced Optical Materials 12.11 (2024): 2302434.
International Search Report and Written Opinion mailed on Nov. 25, 2025, in PCT/US2025/040058.

* cited by examiner

ORGANIC METAL HALIDE HYBRID SCINTILLATORS AND METHODS OF MAKING

CROSS-REFERENCE TO RELATED APPLICATION

This application claims the benefit of U.S. Provisional Applications 63/677,463, filed Jul. 31, 2024, and 63/689,064, filed Aug. 30, 2024, the contents of which are hereby incorporated in their entirety.

STATEMENT REGARDING FEDERALLY SPONSORED RESEARCH OR DEVELOPMENT

This invention was made with government support under grant no. DMR-2204466 awarded by the National Science Foundation. The government has certain rights in the invention.

BACKGROUND

Zero dimensional (0D) organic metal halide hybrids (OMHHs) have recently emerged as a new generation of scintillation materials, due to their high luminescence quantum efficiency, sensitivity, stability, and cost-effectiveness. While numerous 0D OMHH scintillators have been developed to date, most of them are based on solution grown single crystals that require time-consuming synthesis and are limited in size.

SUMMARY

Here, high-performance X-ray scintillators based on facile solution processed zero-dimension organic metal halide hybrid (0D OMHH) amorphous films and method of making are disclosed. A 0D OMHH amorphous film is made by reacting a non-crystalline organic halide salt, for instance, triphenyl(9-phenyl-9H-carbazol-3-yl) phosphonium bromide (TPPcarzBr), with metal halides, for instance, manganese bromide ($MnBr_2$). Zero-dimensional $(TPPcarz)_2MnBr_4$ amorphous films, prepared via solution processing with mild thermal annealing, exhibit green photoluminescence with an emission maximum around 517 nm and a photoluminescence quantum efficiency of around 87%. The X-ray scintillation of 0D $(TPPcarz)_2MnBr_4$ amorphous films is characterized to exhibit a light yield of 44,600 photon $MeV^{-1}$ and an outstanding linearity with a low limit of detection of 32.42 $nGy_{air}s^{-1}$ over a wide range of X-ray dose rates. The versatile processability of 0D $(TPPcarz)_2MnBr_4$ is illustrated with remarkable recyclability, high cost-effectiveness and scalability for large-scale production.

In some aspects, an X-ray scintillator including an amorphous organic metal halide hybrid (a-OMHH) is described. In some aspects, a method of making a-OMHH is disclosed. The method of making a-OMHH including dissolving a non-crystalline organic cation halide and a metal halide in a solvent, thereby forming a solution; curing and drying the solution on a substrate at a temperature that will remove the solvent; and removing an a-OMHH film from the substrate.

BRIEF DESCRIPTION OF DRAWINGS

(FIG. 2C).

DETAILED DESCRIPTION

In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

The disclosure pertains to zero-dimensional (0D) organic metal halide hybrids (OMHHs) utilized as scintillation materials, which are critical in detecting and measuring ionizing radiation. Unlike previous OMHH scintillators that rely on time-consuming synthesis of solution-grown single crystals, this invention introduces high-performance X-ray scintillators in the form of facile solution-processed 0D OMHH amorphous films. These films can be created by reacting non-crystalline organic halide salts, such as triphenyl(9-phenyl-9H-carbazol-3-yl) phosphonium bromide (TPP-carzBr), with metal halides, such as manganese bromide ($MnBr_2$), resulting in $(TPPcarz)_2MnBr_4$ amorphous films can be prepare, amorphous films through facile solution processing with mild thermal annealing. The innovative 0D (TPPcarz)$_2$MnBr$_4$, amorphous films exhibit green photoluminescence with a high photoluminescence quantum efficiency (PLQE). Additionally, these films demonstrate excellent X-ray scintillation performance, characterized by outstanding linearity and a low detection limit across a wide range of X-ray dose rates. This approach allows for versatile processability, remarkable recyclability, high cost-effectiveness, and scalability for large-scale production. By leveraging the amorphous nature of these newly designed OMHHs, the invention opens new avenues for developing high-performance, solution-processable scintillators, making them suitable for various applications in medical imaging, security screening, and radiation detection.

In some aspects, an X-ray scintillator is disclosed, wherein the X-ray scintillator includes an amorphous organic metal halide hybrid (a-OMHH).

In some aspects, the a-OMHH has a composition of $R_kM_1X_m$, where R is an organic cation, for example a large molecule organic cation. M is a metal chosen from Zn, Cu, Mn, Pb, Sn, Sb, and Bi. In some aspects, M is a mixed metal having a composition of $M'_aM''_b$ where M' and M'' are chosen from Zn, Cu, Mn, Pb, Sn, Sb, and Bi. In some aspects, X is a halide chosen from Cl, Br, I, and combinations thereof.

In some aspects, k, l, and m are integers. For example, k is 1, 2, 3, or 4; l is 1, 2, 3, 4; and m is 0, 1, 2, 3, 4. For example, k is 2, l is 1, and m is 4 and the a-OMHH has a composition of $R_2MX_4$.

In some aspects, the organic cation of the a-OMHH is a non-crystalline organic cation, wherein a crystalline organic cation is modified with sterically bulky substituents thereby forming the non-crystalline organic cation. In some aspects, the non-crystalline organic cation is one of modified phosphoniums, modified ammoniums, modified diammoniums, modified triammoniums, modified pyridiniums, modified pyrrolidiniums, modified piperidiniums, or combinations thereof. For example, the modified organic cation includes triphenyl(9-phenyl-9H-carbazol-3-yl) phosphonium (TPPcarz$^+$).

In some aspects, a metal halide of the a-OMHH is an X-ray absorber.

In some aspects, a metal halide of the a-OMHH includes Zn and a halide, wherein the halide is one of Br, Cl, I, or combinations thereof.

In some aspects, the a-OMHH includes (TPPcarz)$_2$MnBr$_4$.

In some aspects, the a-OMHH is a zero-dimensional material.

In some aspects, the a-OMHH is an amorphous film.

In some aspects, a non-crystalline organic halide salt is reacted with a metal halide to form a-OMHH.

In some aspects, the a-OMHH is produced by solution-based processing.

In some aspects, the a-OMHH is produced by low-temperature processing.

In some aspects, the X-ray scintillator including the a-OMHH as described above has visible radioluminescence. In some aspects, the a-OMHH exhibits emission within the visible light spectrum with a peak maximum between 380 and 700 nm. For example, the a-OMHH exhibits violet emission with a peak maximum between 380-450 nm; for example, having a peak maximum at 380 nm, 400 nm, 410 nm, 420 nm, 430 nm, 440 nm, or 450 nm. For example, the a-OMHH exhibits indigo emission with a peak maximum between 420-440 nm; for example, having a peak maximum at 420 nm, 430 nm, or 440 nm. For example, the a-OMHH exhibits blue emission with a peak maximum between 450-495 nm; for example, having a peak maximum at 450 nm, 460 nm, 470 nm, 480 nm, 490 nm, or 495 nm. For example, the a-OMHH exhibits green emission with a peak maximum between 495-570 nm; for example, having a peak maximum at 495 nm, 500 nm, 520 nm, 520 nm, 530 nm, 540 nm, 550 nm, 560 nm, or 570 nm. For example, the a-OMHH exhibits yellow emission with a peak maximum between 570-590 nm; for example, having a peak maximum at 570 nm, 580 nm, or 590 nm. For example, the a-OMHH exhibits orange emission with a peak maximum between 590-620 nm; for example, having a peak maximum at 590 nm, 600 nm, 610 nm, or 620 nm. For example, the a-OMHH exhibits red emission with a peak maximum between 620-750 nm; for example, having a peak maximum at 620 nm, 630 nm, 640 nm, 650 nm, 660 nm, 670 nm, 680 nm, 690 nm, 700 nm, 710 nm, 720 nm, 730 nm, 740 nm, or 750 nm. In one example, the a-OMHH exhibits green emission with a peak maximum at 517 nm.

In some aspects, the X-ray scintillator including the a-OMHH as described above exhibits a photoluminescence quantum efficiency of at least 87%. In some aspects, the X-ray scintillator including the a-OMHH as described above a linear dependence on a radiation dose over a range of 0 to 220 or more $Gy_{air}s^{-1}$.

In some aspects, the X-ray scintillator including the a-OMHH as described above exhibits stable performance at a total dosage of at least 1992500 $\mu Gy_{air}s^{-1}$ of X-ray over 5 days wherein irradiation occurred for 30 minutes each day.

In some aspects, the X-ray scintillator including the a-OMHH as described above exhibits stability when exposed to repeated 120 cycles of on and off X-ray excitation at a dose rate of 221.39 $\mu Gy_{air}s^{-1}$.

In some aspects, t the X-ray scintillator including the a-OMHH as described above has an area on the order several cm$^2$ to m$^2$.

In some aspects, the X-ray scintillator including the a-OMHH as described above exhibits mechanical stability under stress and strain. In some aspects, the X-ray scintillator of shows an elastic modulus of 0.002 Mpa, wherein the elastic modulus is affected by the amorphous structure of a-OMHH.

In some aspects, the a-OMHH as described above can be molded into a desired shape. For example, the a-OMHH may be reheated and reshaped.

In some aspects, a method of making an X-ray scintillator including an amorphous organic metal halide hybrid film (a-OMHH) is disclosed. The method includes dissolving an amorphous organic cation halide and a metal halide in a solvent, thereby forming a solution; curing and drying the solution on a substrate at a temperature that will remove the solvent; and removing the a-OMHH film from the substrate.

In some aspects, the method further includes heating the a-OMHH film to a temperature about a glass transition temperature of the a-OMHH; reshaping the a-OMHH film on a second substrate; cooling the a-OMHH film; removing the a-OMHH film from the second substrate.

Figure 5A:
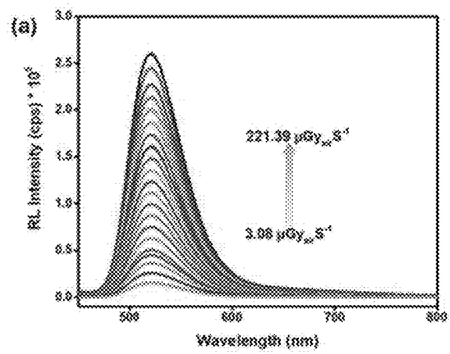
FIGS. 5A-5E show the radioluminescence spectra of a 0D $(TPPcarz)_2MnBr_4$ amorphous film under X-ray excitation with dose rates ranging from 3.08 $\mu Gy_{air}s^{-1}$ to 221.39 $\mu Gy_{air}s^{-1}$ (FIG. 5A); the dose rate dependence of the radioluminescence intensity of a 0D $(TPPcarz)_2MnBr_4$ amorphous film and the linear fitting with a limit of detection determined at 32.42 $nGy_{air}s^{-1}$ (FIG. 5B); the change of radioluminescence intensity of a 0D $(TPPcarz)_2MnBr_4$ amorphous film under continuous X-ray irradiation for 5 days and repeated on-off cycles at a dose rate of 221.39 $\mu Gy_{air}s^{-1}$ (FIG. 5C); a scintillator screen of 4 cm diameter size and 1.8 mm thickness prepared using the disclosed method (FIG. 5D); the X-ray image of an opaque capsule with a built-in metallic spring acquired with a digital camera, using 0D $(TPPcarz)_2MnBr_4$ amorphous film scintillator screen (FIG. 5E).
Figure 5B:
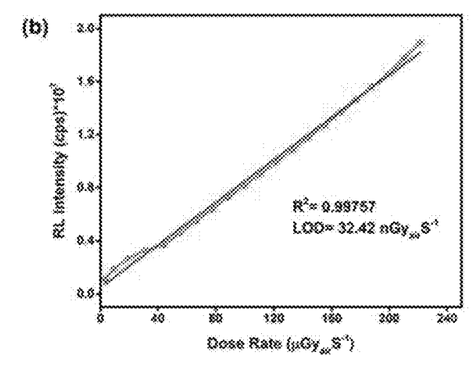
Figure 5C:
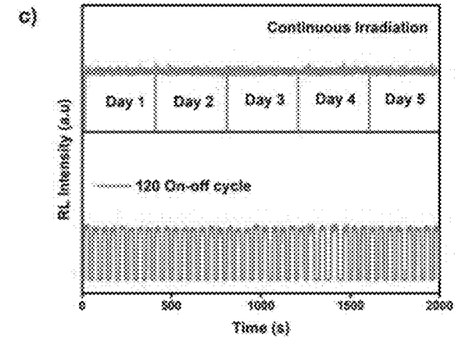
Figure 5D:
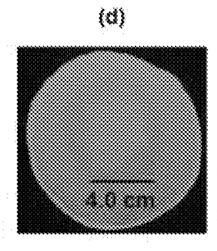
Figure 5E:
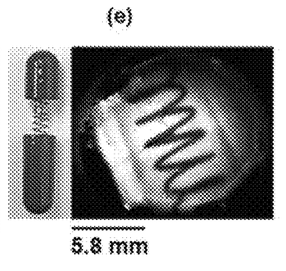

In some aspects, the a-OMHH amorphous film described above can be prepared on a large size/area and used for X-ray imaging (see FIGS. 5D and 5E of the application). The imaging setup and detailed description is also included in the application (see FIG. 7 and [0056]).

EXAMPLE

Example 1: Efficient X-Ray Scintillators Based on Facile Solution Processed Zero-Dimensional Organic Manganese Bromide Hybrid Films Scintillators, materials that emit light when exposed to ionizing radiation, play a crucial role in a wide range of applications, including medical imaging, security screening, nuclear physics, and industrial testing. Commercially available scintillators based on either inorganic crystals or organic compounds have been foundational in radiation detection and imaging for decades. Inorganic scintillators are known for their high light yield and good energy resolution, while organic scintillators offer faster response times and flexibility in form. However, these conventional materials have many notable limitations. For instance, inorganic scintillators often suffer from slow response times and are sensitive to temperature and mechanical stress, while organic scintillators typically have lower light yield and poorer energy resolution. These issues of conventional scintillation materials impede performance in advanced applications, prompting the need for new-generation materials. Additionally, greater environmental stability, non-toxicity, and cost-effective production are sought for new generation scintillators, making them more practical and sustainable for widespread use.

Recently, zero dimensional (0D) organic metal halide hybrids (OMHHs), an emerging class of luminescent materials, have received great attention with applications in a wide range of areas, from light emitting diodes to anti-counterfeiting and scintillation. With organic cations and metal halide anions forming ionically bonded systems, 0D OMHHs have shown great potential as a new generation of scintillation materials, combining the merits of both inorganic and organic scintillators to exhibit high light yield, fast response times, improved energy resolution, environmental stability, and cost-effectiveness. Following previous reports of efficient X-ray scintillators based on 0D ($C_{38}H_{34}P_2$) $MnBr_4$ and $(C_{36}H_{30}NP_2)_2SbCl_5$, a number of single crystalline 0D OMMHs based scintillators have been developed. While excellent scintillation properties have been achieved for many 0D OMHHs, processing high performance large size scintillators based on 0D OMHHs remains challenging. First, growing 0D OMHH single crystals is time consuming and obtaining large size 0D OMHH single crystals is not trivial. Given that researchers can only produce single crystals of up to a few centimeters, it is unrealistic to create large scintillators solely based on 0D OMHH single crystals. Another approach to making large scintillators involves blending 0D OMHH powders with a polymer matrix. However, this method faces numerous issues and challenges, such as reduced light yield due to photon absorption and scattering, optical clarity issues from heterogeneity and nonuniformity, and mechanical instability from thermal mismatches and aging.

Here, a facile approach to producing large size scintillators based on 0D OMHHs is introduced. The large size scintillators are produced by developing amorphous 0D OMHHs through low-temperature solution processing. By taking advantage of the rich chemistry of OMHHs, amorphous 0D (TPPcarz)$_2$MnBr$_4$ films were created by reacting a non-crystalline organic halide salt, triphenyl(9-phenyl-9H-carbazol-3-yl) phosphonium bromide (TPPcarzBr), with $MnBr_2$. These films exhibited green photoluminescence with an emission maximum at 517 nm and a photoluminescence quantum efficiency (PLQE) of approximately 87%. The X-ray scintillation of 0D (TPPcarz)$_2$MnBr$_4$ amorphous films is characterized to exhibit a light yield of 44,600 photon MeV$^{-1}$ and an outstanding linearity with a low limit of detection of 32.42 nGy$_{air}$s$^{-1}$ in ambient conditions over a wide range of X-ray dose rates. Remarkable long-term stability is also observed for amorphous 0D (TPPcarz)$_2$MnBr$_4$ films under both ambient and continuous radiation exposure conditions. Moreover, the amorphous feature of 0D (TPPcarz)$_2$MnBr$_4$ enables exceptional processability, allowing them to be shaped into various forms on demand, and re-softened and re-shaped multiple times, similar to thermoplastics.

Results and Discussions.

Figure 1A:
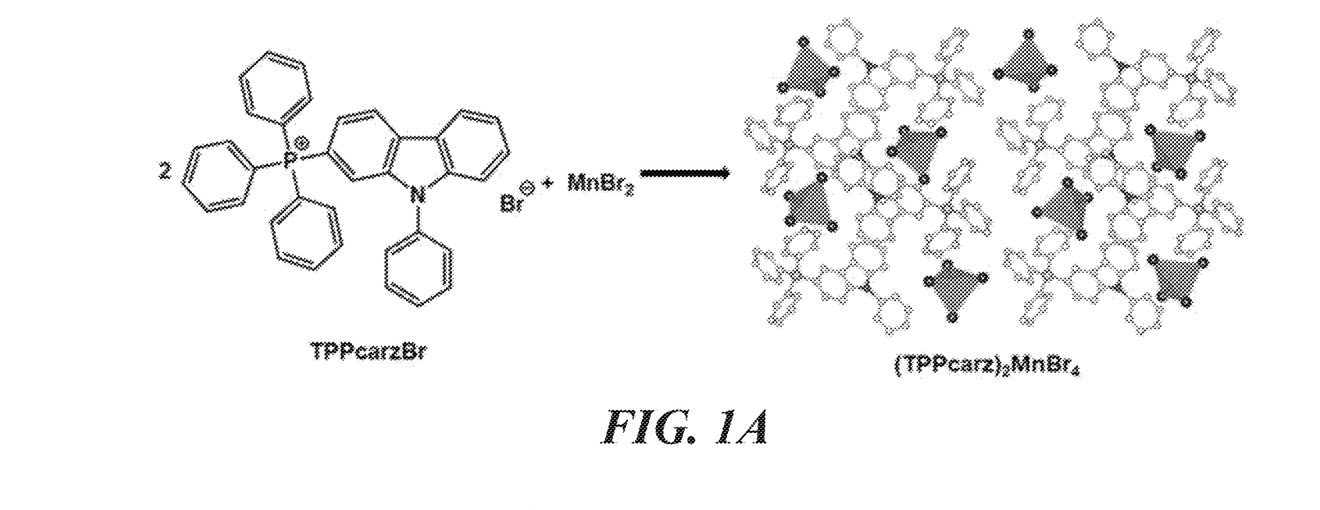
FIGS. 1A-1B show a representation of the chemical reaction between TPPcarzBr and $MnBr_2$, and schematic structure of 0D $(TPPcarz)_2MnBr_4$, where tetrahedral $MnBr_4^{2-}$ anions are surrounded and isolated by $TPPcarz^+$ cations (hydrogens are removed for clarity) (FIG. 1A); and a scheme for the preparation of an amorphous $(TPPcarz)_2MnBr_4$ film via solution processing and thermal annealing (FIG. 1B).
Figure 1B:
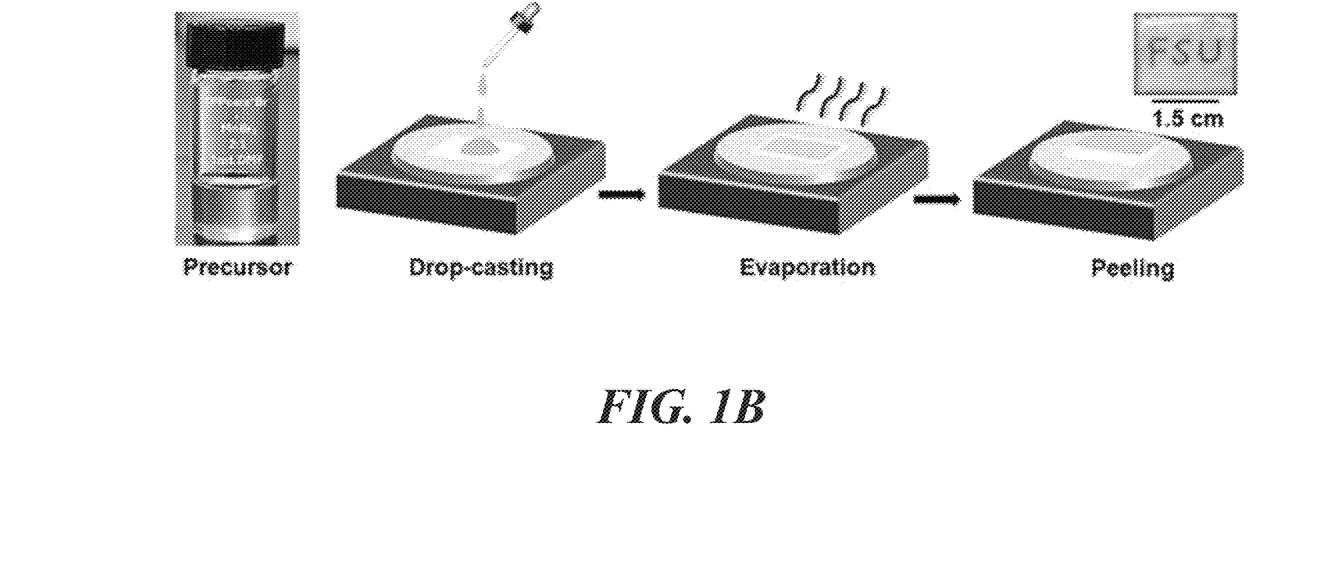

Most 0D OMHHs developed to date are crystalline materials synthesized by reacting organic and metal halide salts in solutions. To obtain amorphous films based on 0D OMHHs, appropriate non-crystalline organic halide salts, instead of crystalline ones, were adapted to react with metal halides. For proof of concept, triphenyl(9-phenyl-9H-carbazol-3-yl) phosphonium bromide (TPPcarzBr) was reacted with $MnBr_2$ to form 0D (TPPcarz)$_2$MnBr$_4$, as shown in FIG. 1A. Specifically, TPPcarzBr and $MnBr_2$ with a 2:1 molar ratio was dissolved in dimethylformamide (DMF) at room temperature to form a clear homogeneous solution with a molar concentration of ~3M. The solution was then drop-cast onto a baking sheet and heated on a hot plate at 100° C. for 24 hours (FIG. 1B). After the solvent evaporated, the resulting yellowish transparent film was easily peeled off from the baking sheet. The thickness of films was tuned by controlling the solution concentration and casting area. Attempts to prepare smooth films using the same method with tetraphenyphosphonium bromide (TPPBr) and $MnBr_2$ were unsuccessful, with only non-homogeneous crystalline films obtained. This is not surprising given the highly crystalline nature of TPPBr; replacing one of the phenyl groups with a bulky carbazole unit results in TPPcarzBr, which exhibits significantly reduced crystallinity.

Figure 2A:
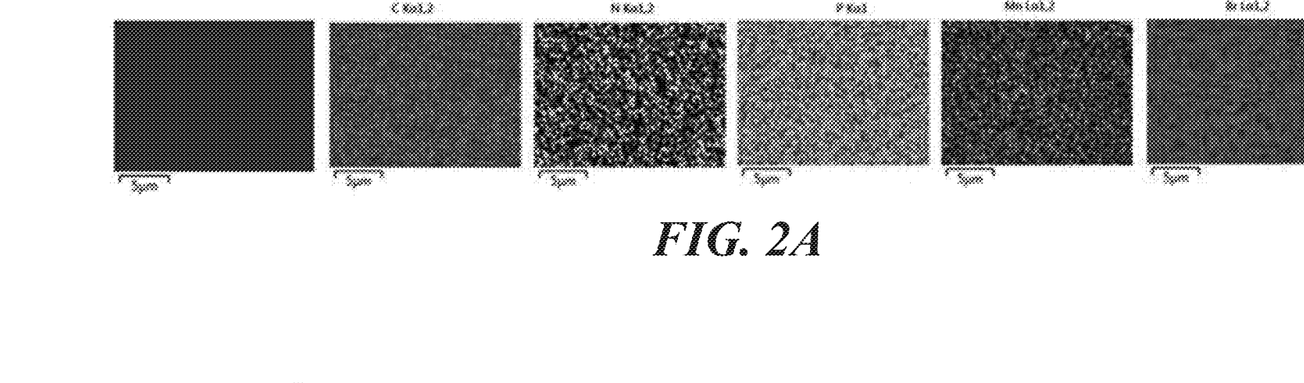
FIGS. 2A-2C show scanning electron microscopy (SEM) images of a solution-processed $(TPPcarz)_2MnBr_4$ film and corresponding elemental mapping of C, N, P, Mn, Br (FIG. 2A); PXRD patterns of an amorphous $(TPPcarz)_2MnBr_4$ film (inset showing the image of the film under ambient light) (FIG. 2B); and excitation and emission spectra of an amorphous $(TPPcarz)_2MnBr_4$ film (Insets show the image of the film under UV light (365 nm)).
Figure 2B:
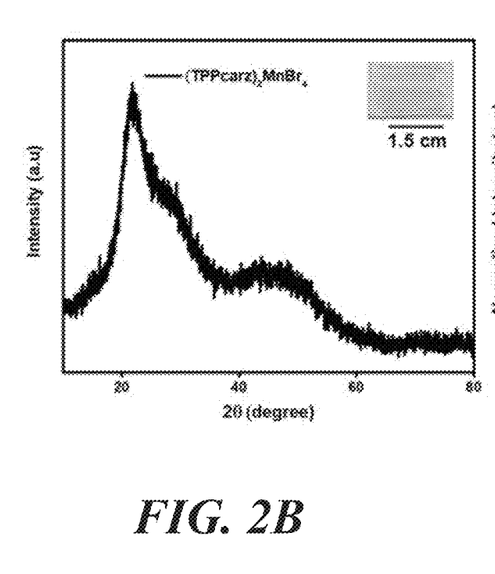
Figure 2C:
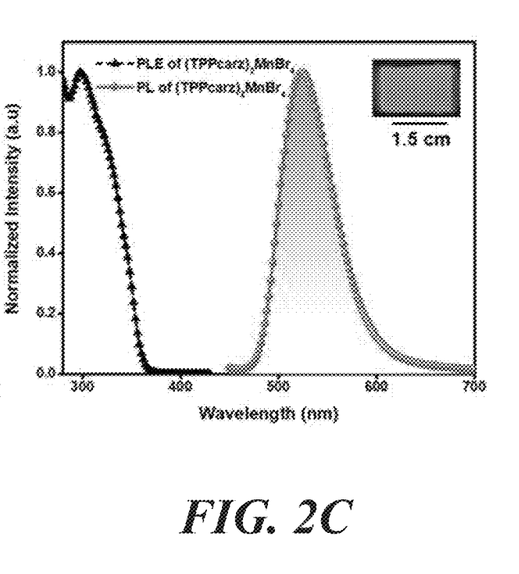
Figure 3:
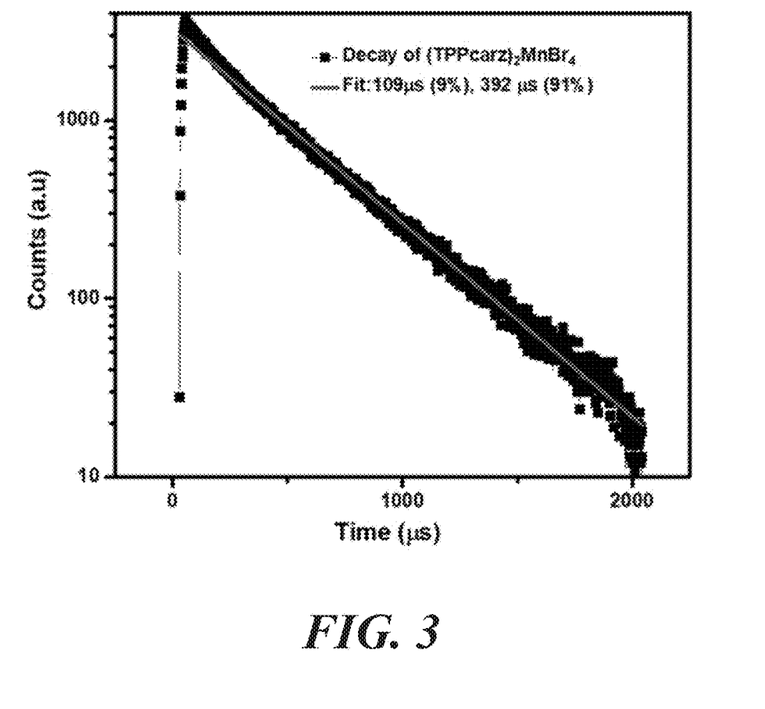
FIG. 3 shows the decay lifetime of $(TPPcarz)_2MnBr_4$.
Figure 4:
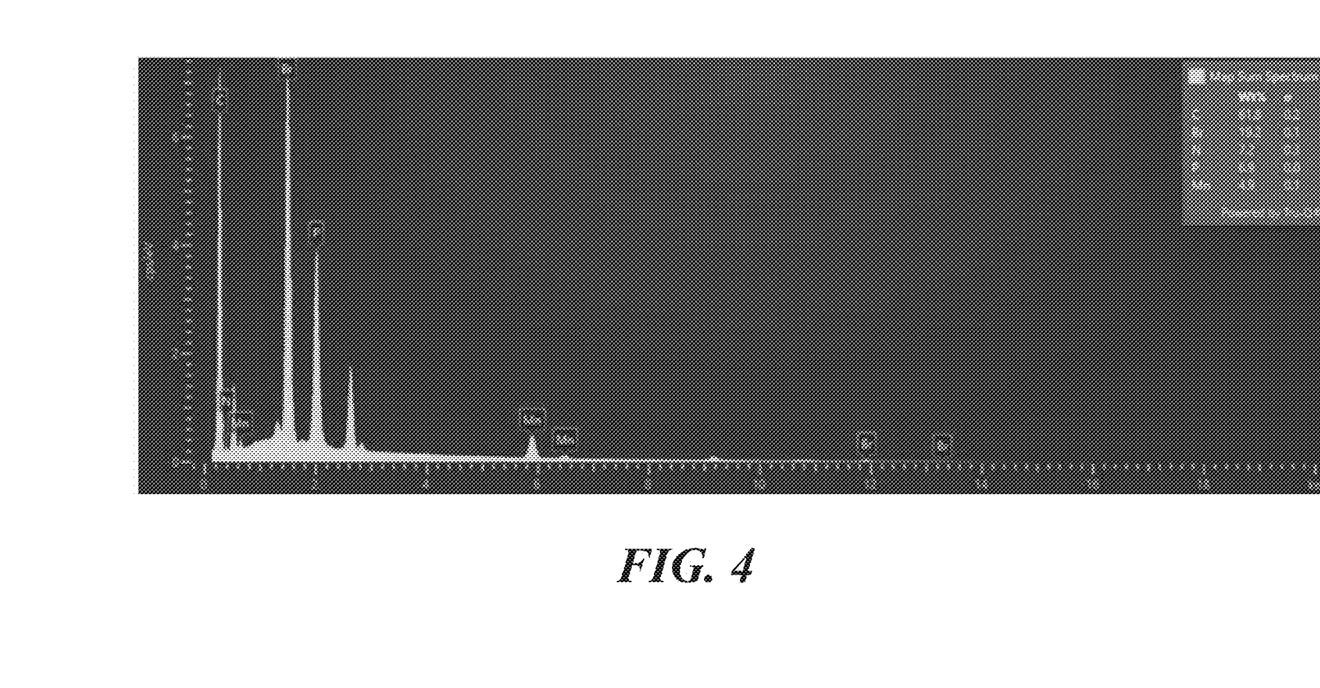
FIG. 4 shows an EDS spectrum and percent weight of each component in $(TPPcarz)_2MnBr_4$.

To confirm the formation of 0D (TPPcarz)$_2$MnBr$_4$ amorphous films, the compositional, structural, and optical properties of prepared films were characterized. FIG. 3A shows a scanning electron microscopy (SEM) image of a prepared film with 1.5 cm length and 1.8 mm thickness, as well the elemental mapping of various components. A uniform spatial distribution of C, N, P, Mn, and Br elements was observed (see FIG. 2A). The weight percent of each component matched well with the theoretical value of (TPPcarz)$_2$ MnBr$_4$ (FIG. 4), suggesting the formation of a product with the molar ratio of 2:1 for TPPcarz:MnBr$_4$. Powder X-ray diffraction (PXRD) was used to characterize the crystallinity of prepared films. Unlike clear diffraction patterns observed for crystalline (TPP)$_2$MnBr$_4$, broadband patterns were observed for the (TPPcarz)$_2$MnBr$_4$ films (see FIG. 2B), suggesting an amorphous nature. The photophysical properties of films were thoroughly characterized using steady-state optical spectroscopy. FIG. 2C shows the photoluminescence (PL) and excitation (PLE) spectra of the films, which were almost identical to those of (TPP)$_2$MnBr$_4$ single crystals. The green emission (inset of FIG. 2C) peaked at around 517 nm and was attributed to the characteristic d-d transition of tetrahedral Mn(II) ($^4T_1 \rightarrow {}^6A_1$), which has a decay lifetime of around 392 s (FIG. 3). All these results suggest the amorphous films were composed of 0D (TPPcarz)$_2$MnBr$_4$.

Figure 6:
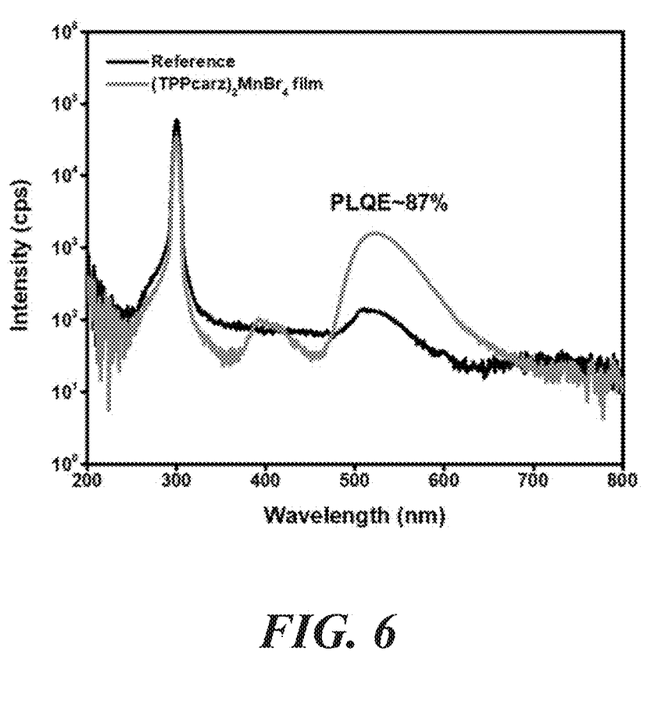
FIG. 6 shows the photoluminescence quantum efficiency (PLQE) of $(TPPcarz)_2MnBr_4$.

To evaluate the scintillation properties of 0D (TPPcarz)$_2$ MnBr$_4$ amorphous films, the radioluminescence was characterized. As shown in FIG. 5A, green radioluminescence with an emission maximum at 517 nm was recorded under X-rays (~10.3 KeV), which was similar to the photoluminescence under UV light (365 nm). The radioluminescence intensity of GD (TPPcarz)$_2$MnBr$_4$ amorphous films was also compared to that of (TPP)$_2$MnBr$_4$ single crystals. The minor difference in intensities suggested that 0D (TPPcarz)$_2$MnBr$_4$ amorphous films possess a similar light yield as that of (TPP)$_2$MnBr$_4$ single crystals. The radioluminescence of GD (TPPcarz)$_2$MnBr$_4$ amorphous films showed an excellent linear dependence on the radiation dose rate in a wide range, as shown in FIG. 5B. The limit of detection was determined to be 32.42 nGy$_{air}$s$^{-1}$ by using the 3σ/slope method which was comparable to those of previously reported OMHHs, much lower than the X-ray diagnostic dose rate required for radiography (5.5 μGy$_{air}$s$^{-1}$). These films have a photoluminescence quantum efficiency (PLQE) of approximately 87% (as shown in FIG. 6).

Figure 7:
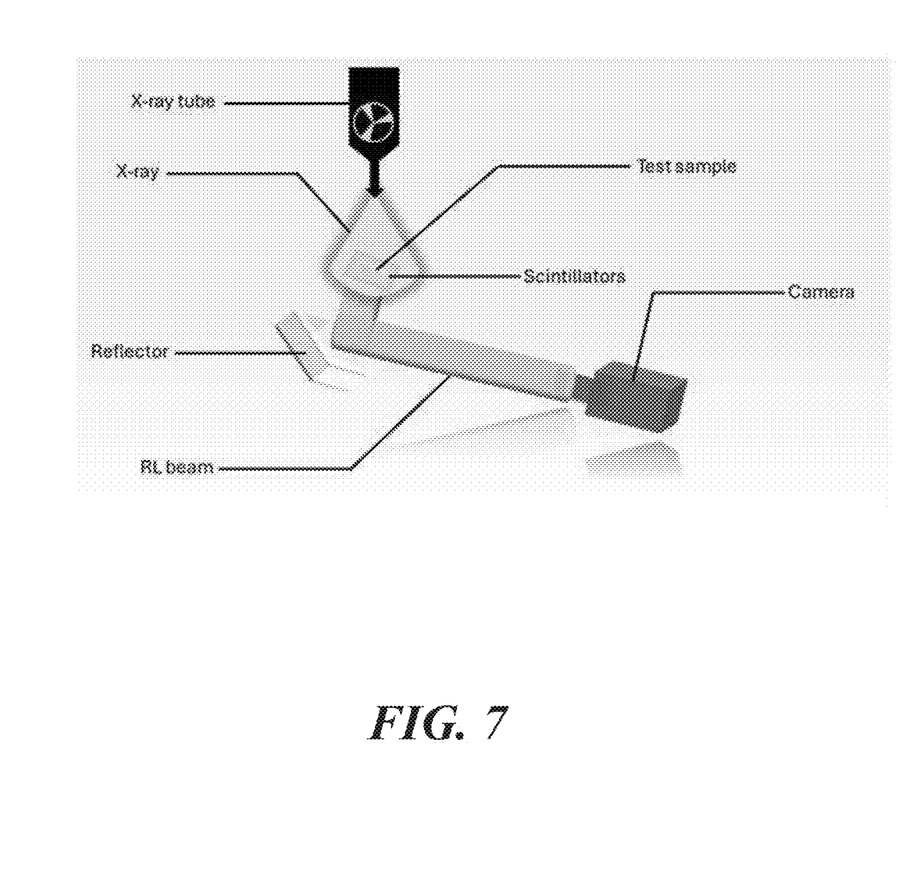
FIG. 7 shows a schematic of X-ray imaging setup.

The stability of 0D (TPPcarz)$_2$MnBr$_4$ amorphous films under continuous X-ray irradiation was also evaluated. It was found that the radioluminescence intensity of (TPPcarz)$_2$MnBr$_4$ remained unchanged after continuous irradiation for 5 days for 30 minutes each day (total dose was ~1992500 μGy$_{air}$) and repeated 120 cycles on and off X-ray excitation (FIG. 5C). To assess the potential of amorphous (TPPcarz)$_2$MnBr$_4$ based scintillators for practical X-ray imaging, a screen of 4 cm diameter size and 1.8 mm thickness was prepared (FIG. 5D) and tested in a home-built X-ray imaging system (FIG. 7). FIG. 6E shows the X-ray image obtained for an opaque capsule with a built-in metallic spring, clearly demonstrating the suitability of 0D (TPPcarz)$_2$MnBr$_4$ amorphous films for X-ray radiography.

Figure 8A:
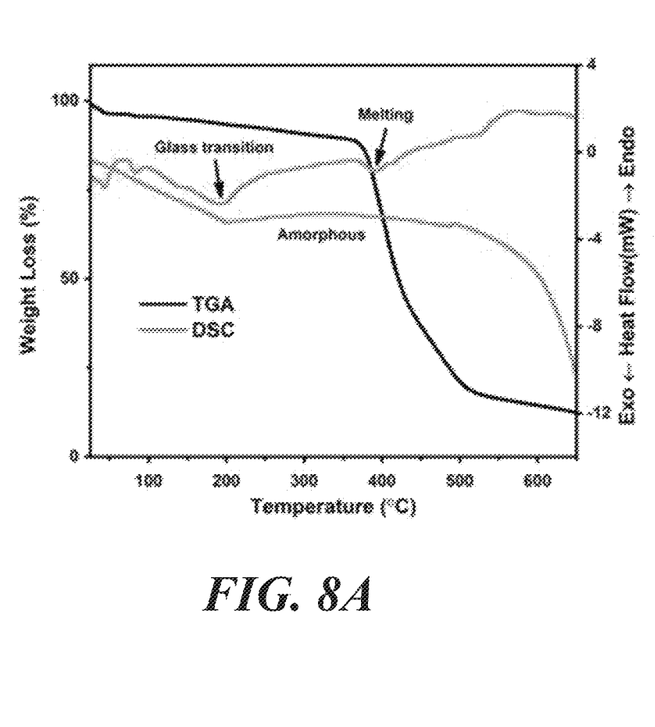
FIGS. 8A-8C show TGA and DSC curves for $(TPPcarz)_2MnBr_4$ (FIG. 8A); the stress-strain characteristics of a 0D $(TPPcarz)_2MnBr_4$ amorphous film (the inset shows the mechanical testing setup, strain rate was 6 mm/min at RT) (FIG. 8B); and images of different shapes of amorphous $(TPPcarz)_2MnBr_4$ processed using molded resoftening-reshaping processes, under ambient and UV lights (FIG. 8C).
Figure 8B:
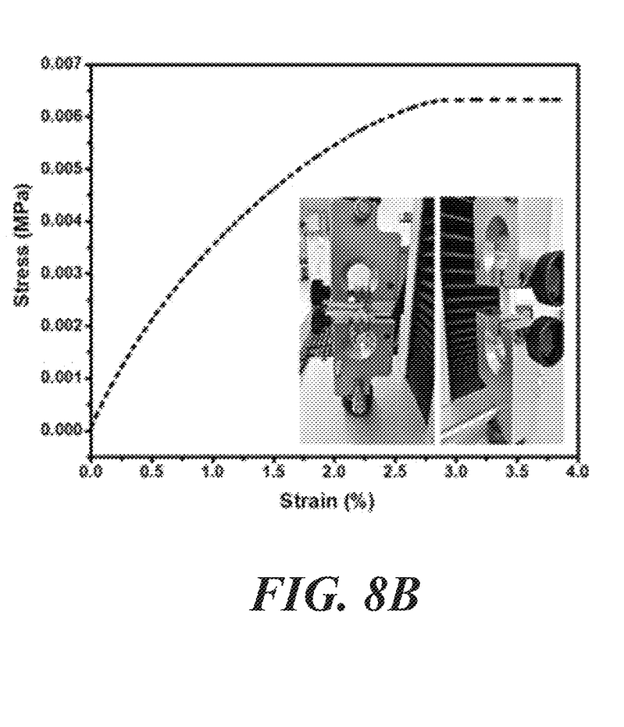

To further illustrate the merits of 0D (TPPcarz)$_2$MnBr$_4$ amorphous films, the thermal and mechanical properties, as well as their versatile processability, were characterized. Thermal stability is crucial for scintillators to ensure consistent performance across temperature variations. The thermal properties of (TPPcarz)$_2$MnBr$_4$ were investigated by thermogravimetric analysis (TGA) and differential scanning calorimetry (DSC). The melting point was measured at approximately 400° C., indicating high thermal stability. The DSC results confirmed the amorphous nature of (TPPcarz)$_2$MnBr$_4$, as no sharp crystallization peak was observed during the exothermic heat flow in FIG. 8A. Mechanical stability is another crucial attribute for scintillators as it ensures they maintain structural integrity and consistent performance under environmental stresses like temperature changes and physical impacts. Without mechanical stability, scintillators can develop defects that compromise efficiency and resolution, affecting the reliability of radiation detection. Compared to crystalline 0D OMHHs, amorphous ones are expected to have much better mechanical stability. Stress-strain measurements were performed on a 0D pellet shaped OMHH film with ~4.5 cm length and ~2.6 mm thickness to evaluate its mechanical response to applied stress, which provides insights into its elasticity, plasticity, and tensile strength. By incrementally increasing the stress and recording the resulting strain, a stress-strain curve was generated and is shown in FIG. 8B. The elastic modulus and the elongation at the break of the (TPPcarz)$_2$MnBr$_4$ film were measured to be 0.002 MPa and 6.7%, respectively. In contrast, single crystal TPPMnBr$_4$ was too hard and too brittle to conduct the same stress-strain measurement. The superior mechanical resilience of amorphous (TPPcarz)$_2$MnBr$_4$ film compared to that of TPPMnBr$_4$ single crystal provides a clear advantage for its application in large size flexible scintillators that require certain tolerance against mechanical deformations.

Figure 8C:
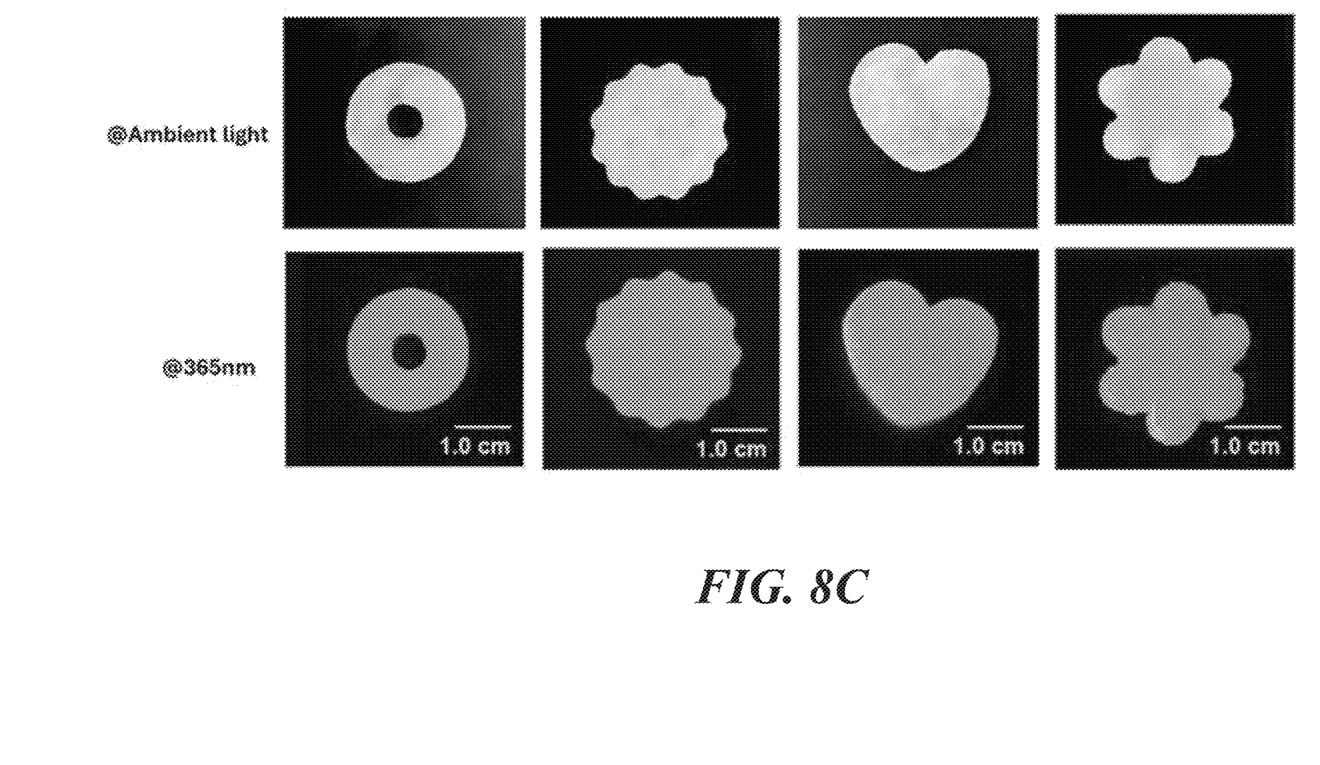

(TPPcarz)$_2$MnBr$_4$ also exhibited excellent processability, as it can be softened and shaped into any desired shape using silicone molds (FIG. 8C). Since the glass transition temperature is approximately 200° C., (TPPcarz)$_2$MnBr$_4$ can be softened by heating to this temperature. The softened material can then be poured into a preheated silicon mold with any shape. Upon cooling, the softened material can be shaped in a solid form. When reheated, the material can be resoftened, allowing it to be reshaped, thereby demonstrating its recyclability. Due to the excellent stability of (TPPcarz)$_2$MnBr$_4$, the optical and scintillation properties remain unchanged throughout these resoftening-reshaping processes. This versatile processing capability makes amorphous (TPPcarz)$_2$MnBr$_4$ ideal for application in scintillators requiring custom shapes and intricate designs. Its ease of reshaping reduces waste and enhances manufacturing efficiency, contributing to its appeal in practical uses.

Experimental Methods and Materials

Chemicals: Manganese(II) bromide, triphenylphosphine (TPP, 99%), 3-bromo-9-phenylcarbazole, nickel (II) Bromide, tetraphenylphosphonium Bromide (97%), diethyl ether (anhydrous), and dimethylformamide (DMF, anhydrous) were purchased from Sigma-Aldrich. Ethylene glycol was purchased from VWR. All reagents and solvents were used without further purification unless otherwise stated.

Figure 9:
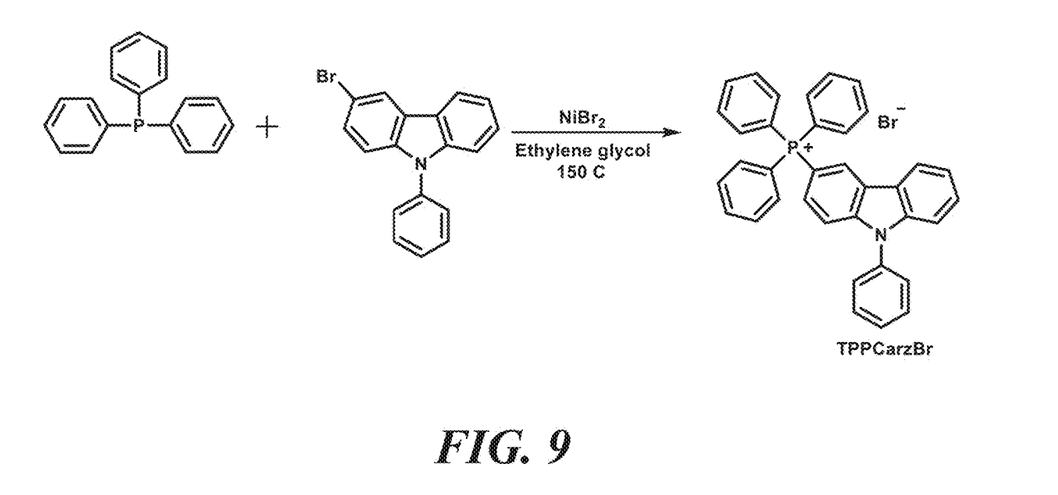
FIG. 9 shows a reaction Scheme for the synthesis of TPPcarzBr.

Synthesis of Triphenyl(9-Phenyl-9H-Carbazol-3-Yl) Phosphonium Bromide (TPPcarzBr): TPPcarzBr was synthesized following a method shown in FIG. 9. In this synthesis, 524 mg (2 mmol) of triphenylphosphine, 644 mg (2 mmol) of 3-bromo-9-phenylcarbazole, and 50 mg (0.2 mmol) of NiBr$_2$ were added to 5 mL of ethylene glycol. The mixture was stirred at 150° C. for 5 hours. The resulting deep green solution was dissolved in water and extracted with dichloromethane. The white powder product was then washed with diethyl ether, yielding a 95% recovery.

Preparation of (TPPcarz)$_2$MnBr$_4$ Film: 2 mmol of TPPcarzBr and 1 mmol of MnBr$_2$ were dissolved in 1 mL of DMF until a completely clear precursor solution was obtained. Then the precursor solution was drop casted into baking paper and kept it in the hot plate at 100° C. for 24 hours.

Optical Characterization: Excitation and steady-state photoluminescence (PL) measurements were performed using an Edinburgh FS5 steady-state spectrometer equipped with a 150 W xenon lamp. The PLQE measurement was conducted using a Hamamatsu Quantaurus-QY Spectrometer (Model C11347-11), which includes a xenon lamp, an integrating sphere sample chamber, and a CCD detector. The PLQEs were calculated using the specified equation (FIG. 6).

$$\eta QE = \frac{I_s}{E_R - E_S} \quad (1)$$

where $I_s$ denotes the luminescence emission spectra of samples, $E_R$ signifies the spectra of the excitation light for the reference (blank substrate), and $E_s$ represents the excitation spectra for exciting the sample.

Powder XRD characterization: The powder X-ray diffraction (XRD) patterns were acquired using a Rigaku Smartlab powder diffractometer with a Cu Kα X-ray source. The diffraction data were collected over a 2θ range from 5° to 500 with a step size of 0.05°, under conditions of 44 mA tube current and 40 kV tube voltage at room temperature.

Radioluminescence characterization: The radioluminescence spectra were obtained using an Edinburgh FS5 spectrofluorometer (Edinburgh Instruments) outfitted with an X-ray source (Moxtek Mini-X tube featuring a tungsten (W) target and a maximum power output of 4 W). The radiation dose rate of the X-ray source was calibrated using a RaySafe 452 dosimeter. To determine the Limit of Detection (LOD), background signals were recorded under X-ray irradiation without the sample. Next, a series of signal responses was measured with the sample by incrementally increasing the X-ray dose rate, and the slope was calculated. The LOD was then derived using the equation provided below, with $Bk_{std}$ representing the standard deviation of the background response.

$$\frac{3 \cdot Bk_{std}}{slope} \quad (2)$$

The light yield of $(TPPcarz)_2MnBr_4$ scintillator was estimated with Ce:LuAG used as the reference (light yield of 25,000 photon $MeV^{-1}$). The light yield was determined to be around 44,600 photon $MeV^{-1}$, similar to that of previously reported amorphous $(ETP)_2MnBr_4$ metal halide X-ray scintillator.

X-ray Imaging: The X-ray imaging system was constructed as illustrated in FIG. 7. The imaging utilized a Moxtek Mini-X tube with a tungsten target and a maximum power output of 4 W. The dose rate applied was 221.39 $\mu Gy_{air}s^{-1}$. In this setup, the X-ray beam passed vertically through the object of interest, and the scintillator film was positioned directly beneath it. The radioluminescence generated was then deflected towards the camera by a reflector angled within the imaging system to mitigate the adverse effects of direct X-ray irradiation on the camera. A digital camera was used to capture the deflected image.

Elemental Characterization: The SEM Images and corresponding EDS spectrums of individual components were captured by Nova NanoSEM 400 (FEI Company) at 3.0 KV scanning voltage.

Thermal and DSC Analysis: Thermogravimetric analysis (TGA) was conducted using a TA Instruments Q600 system. The sample was heated from room temperature to 700° C. at a rate of 5° C. per minute under an argon flow of 100 mL per minute.

Tensile Testing: The mechanical testing of the amorphous film was done using Thümler GmbH tensile test machine Z3. A pellet sized film with ~4.5 cm length and ~2.6 mm thickness was prepared for testing the samples. The strain rate was 6 mm/min at room temperature. The Young's modulus is calculated using the Hook's Law from the initial, linear portion of the stress-strain curve, where the material behaves elastically.

$$E = \frac{\sigma}{\epsilon} \quad (3)$$

Here, E is the Young's modulus, $\sigma$ is the stress, and $\epsilon$ is the strain.

Strain is Calculated Using the Formula:

$$\epsilon = \frac{\Delta L}{L_0} \quad (4)$$

$\epsilon$ is the strain, $\Delta L$ is the change in length and $L_0$ is the original length.

CONCLUSIONS

In summary, the use of non-crystalline organic halide salts has been demonstrated for the preparation of amorphous 0D organic metal halide hybrid films via simple low temperature solution processing. This processing method significantly simplifies the material manufacturing process, making it more cost-effective and scalable for large-scale production. The solution processed 0D $(TPPcarz)_2MnBr_4$ amorphous films exhibit green photoluminescence and radioluminescence with an emission maximum at 517 nm with a high photoluminescence quantum efficiency of ~87%, a radiation light yield of 44,600 photon $MeV^{-1}$, and an excellent linearity over a wide range of X-ray dose rates. In addition to excellent scintillation properties, solution processed amorphous $(TPPcarz)_2MnBr_4$ possesses high thermal stability, outstanding mechanical properties, and remarkable processability, making it a highly promising scintillation material for easy integration into various devices and systems with enhanced performance and sustainability. This work underscores the remarkable versatility of 0D OMHHs, which can be molecularly engineered to achieve desired functionalities for next-generation scintillators and numerous other applications.

Additional Embodiments

1. An X-ray scintillator comprising an amorphous organic metal halide hybrid (a-OMHH).

2. The X-ray scintillator of embodiment 1, wherein the a-OMHH has a composition of $R_kM_lX_m$, wherein R is an organic cation, M is a metal chosen from Zn, Cu, Mn, Pb, Sn, Sb, and Bi, and X is a halide chosen from Cl, Br, I, and combinations thereof, and wherein k, l, and m are integers.

3. The X-ray scintillator of embodiment 2, wherein the a-OMHH has a composition of $R_2MX_4$.

4. The X-ray scintillator of embodiment 2, wherein the organic cation is a non-crystalline organic cation, wherein a crystalline organic cation is modified with appropriate substituents thereby forming the non-crystalline organic cation.

5. The X-ray scintillator of embodiment 4, wherein the non-crystalline organic cation is one of modified phosphoniums, modified ammoniums, modified diammoniums, modified triammoniums, modified pyridiniums, modified pyrrolidiniums, modified piperidiniums, or combinations thereof.

6. The X-ray scintillator of embodiment 5, wherein the non-crystalline organic cation comprises triphenyl(9-phenyl-9H-carbazol-3-yl) phosphonium ($TPPcarz^+$).

7. The X-ray scintillator of embodiment 1, wherein a metal halide of the a-OMHH is an X-ray absorber.

8. The X-ray scintillator of embodiment 1, wherein a metal halide of the a-OMHH comprises Mn and a halide, wherein the halide is one of Br, Cl, I, or combinations thereof.

9. The X-ray scintillator of embodiment 8, wherein the a-OMHH comprises $(TPPcarz)_2MnBr_4$.

10. The X-ray scintillator of embodiment 1, wherein the a-OMHH is a zero-dimensional material.

11. The X-ray scintillator of embodiment 10, prepared by reacting a non-crystalline organic halide salt with a metal halide.

12. The X-ray scintillator of embodiment 1, wherein the a-OMHH is an amorphous film.

13. The X-ray scintillator of embodiment 1, wherein the a-OMHH is produced by solution-based processing.

14. The X-ray scintillator of embodiment 1, wherein the a-OMHH is produced by low-temperature processing.

15. The X-ray scintillator of embodiment 1, wherein the X-ray scintillator has visible radioluminescence.

16. The X-ray scintillator of embodiment 1, wherein the X-ray scintillator exhibits a green emission with a peak maximum at 517 nm.

17. The X-ray scintillator of embodiment 1, wherein the X-ray scintillator exhibits a photoluminescence quantum efficiency of at least 87%.

18. The X-ray scintillator of embodiment 1, wherein the X-ray scintillator exhibits a linear dependence on a radiation dose over a range of 0 to 220 $\mu Gy_{air}s^{-1}$ or more.

19. The X-ray scintillator of embodiment 1, wherein the X-ray scintillator is characterized to exhibit a light yield of 44,600 photon $MeV^{-1}$.

20. The X-ray scintillator of embodiment 15, wherein the X-ray scintillator exhibits stable performance at a total dosage of at least 1992500 $\mu Gy_{air}$ of X-ray over 5 days wherein irradiation occurred for 30 minutes each day.

21. The X-ray scintillator of embodiment 1, wherein the X-ray scintillator exhibits stability when exposed to repeated 120 cycles of on and off X-ray excitation at a dose rate of 221.39 $nGy_{air}s^{-1}$.

22. The X-ray scintillator of embodiment 1, wherein the X-ray scintillator has an area on the order of several $cm^2$ to several $m^2$.

23. The X-ray scintillator of embodiment 1, wherein the X-ray scintillator exhibits mechanical stability under stress and strain.

24. The X-ray scintillator of embodiment 1, shows an elastic modulus of 0.002 Mpa, wherein the elastic modulus is affected by an amorphous structure of a-OMHH.

25. The X-ray scintillator of embodiment 1, wherein the a-OMHH is moldable into a desired shape.

26. The X-ray scintillator of embodiment 1, wherein the a-OMHH is reheated and reshaped.

27. A method of making an amorphous organic metal halide hybrid film (a-OMHH), the method comprising:
    dissolving an amorphous organic cation halide and a metal halide in a solvent, thereby forming a solution;
    curing and drying the solution on a substrate at a temperature that will remove the solvent; and
    removing the a-OMHH film from the substrate.

28. The method of embodiment 26, the method further comprising:
    heating the a-OMHH film to a temperature about a glass transition temperature of the a-OMHH;
    reshaping the a-OMHH film on a second substrate;
    cooling the a-OMHH film; and
    removing the a-OMHH film from the second substrate.

The construction and arrangement of the systems and methods as shown in the various implementations are illustrative only. Although only a few implementations have been described in detail in this disclosure, many modifications are possible (e.g., variations in sizes, dimensions, structures, shapes, and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value.

When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

To facilitate an understanding of the principles and features of various embodiments of the present invention, they are explained hereinafter with reference to their implementation in illustrative embodiments.

As used herein, the term "composition" is intended to encompass a product comprising the specified ingredients in the specified amounts, as well as any product which results, directly or indirectly, from a combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight, components Y, X, and Y are present at a weight ratio of 2:5 and are present in such ratio regardless of whether additional components are contained in the mixture.

A weight percent (wt. %) of a component, unless specifically stated to the contrary, is based on the total weight of the formulation or composition in which the component is included.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

What is claimed is:

1. An X-ray scintillator comprising an amorphous organic metal halide hybrid (a-OMHH).

2. The X-ray scintillator of claim 1, wherein the a-OMHH has a composition of $R_k M_l X_m$, wherein R is an organic cation, M is a metal chosen from Zn, Cu, Mn, Pb, Sn, Sb, and Bi, and X is a halide chosen from Cl, Br, I, and combinations thereof, and wherein k, l, and m are integers.

3. The X-ray scintillator of claim 2, wherein the a-OMHH has a composition of $R_2 MX_4$.

4. The X-ray scintillator of claim 2, wherein the organic cation is one of modified phosphoniums, modified ammoniums, modified diammoniums, modified triammoniums, modified pyridiniums, modified pyrrolidiniums, modified piperidiniums, or combinations thereof.

5. The X-ray scintillator of claim 4, wherein the organic cation comprises triphenyl(9-phenyl-9H-carbazol-3-yl)phosphonium ($TPPcarz^+$).

6. The X-ray scintillator of claim 1, wherein a metal halide of the a-OMHH is an X-ray absorber.

7. The X-ray scintillator of claim 1, wherein a metal halide of the a-OMHH comprises Mn and a halide, wherein the halide is one of Br, Cl, I, or combinations thereof.

8. The X-ray scintillator of claim 7, wherein the a-OMHH comprises $(TPPcarz)_2 MnBr_4$.

9. The X-ray scintillator of claim 1, wherein the a-OMHH is a zero-dimensional material.

10. The X-ray scintillator of claim 1, wherein the a-OMHH is an amorphous film.

11. The X-ray scintillator of claim 1, wherein the X-ray scintillator has visible radioluminescence.

12. The X-ray scintillator of claim 1, wherein the X-ray scintillator exhibits a green emission with a peak maximum at 517 nm.

13. The X-ray scintillator of claim 1, wherein the X-ray scintillator exhibits a photoluminescence quantum efficiency of at least 87%.

14. The X-ray scintillator of claim 1, wherein the X-ray scintillator exhibits a linear dependence on a radiation dose over a range of 0 to 220 $\mu Gy_{air} s^{-1}$ or more.

15. The X-ray scintillator of claim 1, wherein the X-ray scintillator is characterized to exhibit a light yield of 44,600 photon $MeV^{-1}$.

16. The X-ray scintillator of claim 1, wherein the X-ray scintillator has an area on the order of several $cm^2$ to several $m^2$.

17. A method of making an amorphous organic metal halide hybrid film (a-OMHH), the method comprising:
dissolving an amorphous organic cation halide and a metal halide in a solvent, thereby forming a solution;
curing and drying the solution on a substrate at a temperature that will remove the solvent; and
removing the a-OMHH film from the substrate.

18. The method of claim 17, the method further comprising:
heating the a-OMHH film to a temperature about a glass transition temperature of the a-OMHH;
reshaping the a-OMHH film on a second substrate;
cooling the a-OMHH film; and
removing the a-OMHH film from the second substrate.

19. The X-ray scintillator of claim 1, wherein at least portion of the a-OMHH amorphous film is configured to receive X-ray irradiation and generate an X-ray image.

20. A method of X-ray imaging a sample, comprising disposing the a-OMHH amorphous film of claim 1 directly beneath the sample and irradiating the sample from above with an x-ray beam.

* * * * *